United States Patent [19]

Chu et al.

[11] Patent Number: 4,916,097

[45] Date of Patent: Apr. 10, 1990

[54] METHOD FOR ACTIVATING ZEOLITES CONTAINING ORGANIC CATIONS

[75] Inventors: Yung F. Chu, Plainsboro; John P. McWilliams, Woodbury, both of N.J.

[73] Assignee: Mobil Oil Corp., New York, N.Y.

[21] Appl. No.: 194,683

[22] Filed: May 16, 1988

[51] Int. Cl.$^4$ .................................. B01J 29/06
[52] U.S. Cl. ................................ 502/85; 502/62
[58] Field of Search ............................. 502/62, 85

[56] References Cited

U.S. PATENT DOCUMENTS

| | | | |
|---|---|---|---|
| 3,308,069 | 3/1967 | Wadlinger et al. | 252/455 Z |
| 3,702,886 | 11/1972 | Argauer et al. | 423/328 |
| 3,709,979 | 1/1973 | Chu | 423/328 |
| 3,832,449 | 8/1974 | Rosinski et al. | 423/328 |
| 3,972,983 | 8/1976 | Ciric | 423/328 |
| 4,016,245 | 4/1977 | Plank et al. | 423/328 |
| 4,076,842 | 2/1978 | Plank et al. | 423/328 |
| 4,187,283 | 2/1980 | Kokotailo et al. | 423/328 |
| 4,476,338 | 10/1984 | Chang et al. | 585/322 |
| 4,522,929 | 6/1985 | Chester et al. | 502/77 |
| 4,556,477 | 12/1985 | Dwyer | 208/111 |
| 4,559,314 | 12/1985 | Shihabi | 502/71 |
| 4,568,654 | 2/1986 | Valyocsik | 502/62 |

*Primary Examiner*—Carl F. Dees
*Attorney, Agent, or Firm*—Alexander J. McKillop; Charles J. Speciale; Dennis P. Santini

[57] ABSTRACT

A method for activation of an organic cation-containing crystalline catalyst is disclosed. The method includes contacting the catalyst with steam under conditions to decompose the organic cations, which result in the activation of the catalyst. The method has the advantage that organic cations are converted to non-hazardous by-products such as ammonia and light hydrocarbons such as ethylene. These are more easily controlled by environmental control schemes than higher molecular weight by-products resulting from traditional activation methods (nitrogen or nitrogen/air). The steamed catalyst can optionally be calcined to remove any organic material which may remain after steaming.

For instance, a major product which results from decomposting the tetraethylammonium organic cations in zeolite $\beta$ is ethylene. The ethylene can be subsequently converted into carbon dioxide and water by oxidation.

15 Claims, 5 Drawing Sheets

METHOD FOR ACTIVATING ZEOLITES CONTAINING ORGANIC CATIONS

BACKGROUND OF THE INVENTION

The present invention relates generally to a method for activating zeolite catalysts and, more particularly, to a method for removing organic cations from organic cation-containing crystalline zeolites. The present invention further relates to the conversion of by-products resulting from the removal of the organic cations to environmentally safe products.

Zeolite materials, both natural and synthetic, contain catalytic properties which make them extremely useful in various types of hydrocarbon conversions. These zeolite materials have been used as catalysts under various operating conditions to effect such reactions as cracking, hydrocracking, dewaxing, reforming, hydroforming, isomerization, polymerization, hydroisomerization and alkylation, just to name a few.

Some of the synthetic zeolites which are useful in the conversion of hydrocarbons, especially, but not exclusively in those reactions mentioned above, contain as synthesized organic cations or a mixture of organic cations and metal cations.

When the synthetic zeolites are prepared in the presence of organic cations they are often initially catalytically inactive. It is believed that this catalytic inactivity can be ascribed to the presence in the intracrystalline free space of the zeolite of organic cations from the reaction mixture. While it is not absolutely essential to employ reaction mixtures which contain organic cations in the synthesis of some zeolites, it is believed that when organic cations are present in the reaction, a synthetic zeolite of desired crystalline structure is produced.

The need to remove organic cations from synthetic zeolites to render them catalytically active has been recognized. However, a variety of the techniques heretofore employed are subject to several disadvantages, since the organic cation-containing zeolites may have undesirably low adsorptive properties and become amorphous or lose their crystalline structure if subjected to very elevated temperatures, such as those which may be necessary to remove the organic material in the channels or expel any adsorbed material. Thus, because of diffusion limitations, high temperature for extended periods of time are often required to oxidize the organic material in the channel system and such rigorous treatment tends to disrupt the zeolite framework, adversely affecting its stability and adsorptive properties.

One approach for removing organic cations from organic cation-containing zeolites has been described in U.S. Pat. No. 4,187,283. The method described includes the sequential steps of (1) heating the organic cation-containing zeolite at a temperature within the approximate range of 150° to 600° C. for a period of time sufficient to decompose organic material contained in the zeolite without effecting coking thereof, (2) contacting the resulting product with an aqueous solution of a monovalent metal salt at a temperature between about 50° and about 120° C. for a period of time sufficient to expel at least a major proportion of the decomposition products of said organic material and (3) calcining the product so obtained at a temperature of at least about 500° C. but below a temperature at which crystallinity of the zeolite is adversely affected.

In U.S. Pat. Nos. 4,559,314 and 4,522,929 the organic cation-containing zeolite is activated, that is, the organic cations are removed by heating them in an inert atmosphere at 1000° F. for one hour, for example, followed by base exchange with ammonium salts followed by calcination at 1000° F. in air.

For example, it is known to contact the organic cation-containing zeolite with nitrogen, prior to calcination, in order to remove the organic cations therefrom. However, nitrogen precalcination typically results in the production of undesirable by-products. The particular product resulting from the nitrogen precalcination of the synthetic zeolite depends upon the type of organic component used in the zeolite synthesis. For instance, in the synthesis of zeolite beta and ZSM-12, reaction mixtures containing tetraethylammonium (TEA) cation are most typically employed. The products which result from the nitrogen precalcination of these organic cation-containing zeolites are ethylene, triethylamine, $C_{4}+$ olefins, ammonia and alkylbenzenes. The triethylamine and aromatic emissions resulting from the nitrogen precalcination of zeolite beta and ZSM-12 present a problem regarding environmental considerations because of the negative effect these emissions have on the environment.

It is therefore an object of the present invention to provide a method for activating zeolite catalysts containing organic cations using steam to substantially decompose the organic cations.

It is a further object of this invention to convert by-products resulting from the removal of organic cations from zeolites to environmentally safe products.

SUMMARY OF THE INVENTION

In accordance with the present invention, there is provided a method for activating an organic cation-containing crystalline catalyst. The catalyst is activated by removing the organic cations therefrom.

Broadly contemplated, the method described herein comprises contacting the catalyst with steam under conditions resulting in the substantial decomposition of the organic cation, and activation of the catalyst. The thus treated crystalline catalyst can be used in a variety of hydrocarbon conversions.

The method of the present invention has the advantage that organic cations in zeolites are converted to nonhazardous by-products such as ammonia and light hydrocarbons such as ethylene. These are more easily dealt with by environmental control schemes than higher molecular weight byproducts resulting from traditional activation methods such as those using nitrogen and air.

Any undesirable products which may be produced from decomposing the organic cations can be condensed after the catalyst has been contacted with steam.

As discussed in further detail hereinafter, light hydrocarbons of $C_4$ and lower such as ethylene can be a major product from decomposing the organic cations in accordance with the present invention. The light hydrocarbons produced can be subsequently converted into, among other things, carbon dioxide. To this end, the light hydrocarbons can be converted by oxidizing over an oxidation catalyst under processing conditions which will result in the production of carbon dioxide.

For a better understanding of the present invention together with other and further objects, reference is made to the following description taken together with the accompanying drawings, and its scope will be pointed out in the appended claims.

DESCRIPTION OF THE PREFERRED EMBODIMENT

Figure 1:
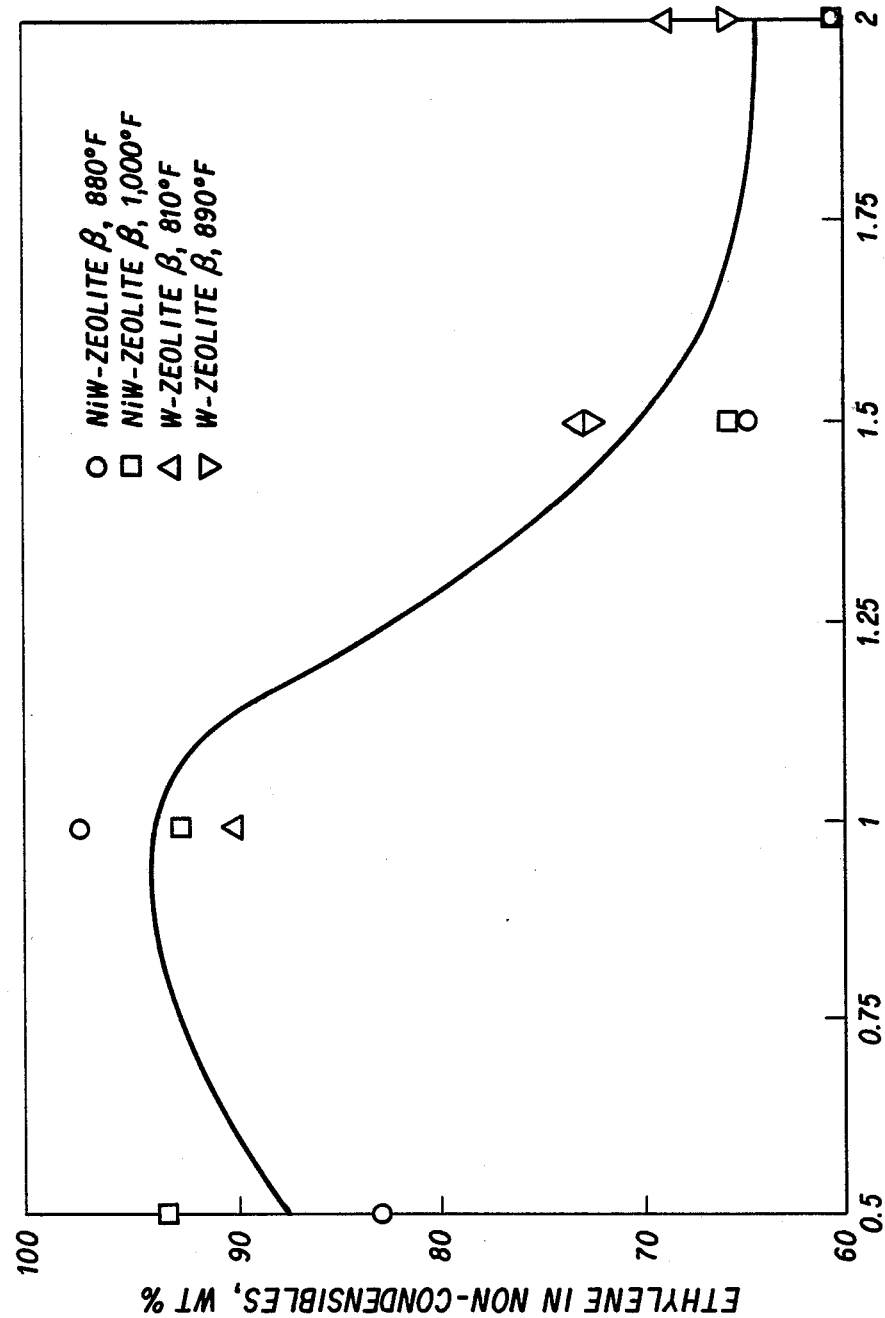
FIG. 1 illustrates the emission profiles of ethylene during the steam precalcination of both Ni-W and W-zeolite Beta catalysts.

The present invention provides an effective means for developing the full catalytic activity of organic cation-containing zeolites. Typical organic cations present in the zeolites contemplated for treatment in accordance with the method described herein include, but are not limited to, tetramethylammonium, tetraethylammonium, tetrapropylammonium, tetrabutylammonium, tetrabutylphosphonium, monopropylamine, dipropylamine, and organic nitrogen-containing cations derived from ethylenediamine, propylamine, pyrrolidine or 2-(hydroxyalkyl)-trialkylammonium compounds, e.g., 2-(hydroxyethyl) trimethylammonium chloride.

As merely illustrative, and not wishing to be limited to the organic cation-containing zeolite described, ZSM-5, ZSM-6, ZSM-11, ZSM-12, ZSM-20, ZSM-22, ZSM-23, ZSM-35, ZSM-47 ZSM-48, ZSM-51, zeolite Beta and similar materials are representative of the zeolites which may effectively be treated in accordance with the method of this invention.

ZSM-5 is described with particularity in U.S. Pat. No. 3,702,886, the entire contents of which are incorporated herein by reference.

ZSM-11 is described with particularity in U.S. Pat. No. 3,709,979, the entire contents of which are incorporated herein by reference.

ZSM-12 is described with particularity in U.S. Pat. No. 3,832,449, the entire contents of which are incorporated herein by reference.

ZSM-20 is described with particularity in U.S. Pat. No. 3,972,983, the entire contents of which are incorporated herein by reference.

ZSM-22 is described with particularity in U.S. Pat. No. 4,556,477, the entire contents of which are incorporated herein by reference.

ZSM-23 is described with particularity in U.S. Pat. No. 4,076,842, the entire contents of which are incorporated herein by reference.

ZSM-35 is described with particularity in U.S. Pat. No. 4,016,245, the entire contents of which are incorporated herein by reference.

ZSM-48 is described with particularity in U.S. Pat. No. 4,476,338, the entire contents of which are incorporated herein by reference.

ZSM-51 is described with particularity in U.S. Pat. No. 4,568,654, the entire contents of which are incorporated herein by reference.

Zeolite Beta is described with particularity in U.S. Pat. No. 3,308,069, the entire contents of which are incorporated herein by reference.

The composition of zeolite Beta in its as synthesized form is as follows on an anhydrous basis:

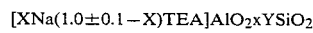

$$[XNa(1.0\pm0.1-X)TEA]AlO_2 xYSiO_2$$

where X is less than 1, preferably less than 0.75; TEA represents the tetraethylammonium ion; Y is greater than 5 but less than 100. In the as-synthesized form, water of hydration may also be present in ranging amounts.

The sodium is derived from the synthesis mixture used to prepare the zeolite. This synthesis mixture contains a mixture of the oxides (or of materials whose chemical compositions can be completely represented as mixtures of the oxides) $Na_2O$, $Al_2O_3$, $[(C_2H_5)_4N_2O]$, $SiO_2$ and $H_2O$. The mixture is held at a temperature of about 75° C. to 200° C. until crystallization occurs. The composition of the reaction mixture expressed in terms of mole ratios, preferably falls within the following ranges:

$SiO_2/Al_2O_3$ - 10 to 200

$Na_2O$/tetraethylammonium hydroxide (TEAOH) - 0.0 to 0.1

$TEAOH/SiO_2$ - 0.1 to 1.0

$H_2O/TEAOH$ - 20 to 75

The product which crystallizes from the hot reaction mixture is separated, suitably by centrifuging or filtration, washed with water and dried. The Na form of zeolite Beta can be ion exchanged and the Na replaced by another metal such as Ni.

In making zeolite Beta, the method comprises reacting in aqueous media amorphous silica solids or sols and a soluble aluminate along with aqueous solutions of tetraethylammonium hydroxide. The aluminate may be sodium aluminate or tetraethylammonium aluminate. Amorphous silicaalumina solids may be used as the source of the silica and alumina. The reaction mixture is initially continuously or periodically stirred to insure homogeneity. After this mixing, agitation may be stopped as it is unnecessary to agitate the reaction mass during the formation and crystallization of the zeolite, although mixing during such latter stages has not been found to be detrimental.

The crystallization procedures can be satisfactorily carried out at temperature within the range from about 75° C. to about 200° C. The pressure during crystallization is atmospheric or at least that which corresponds to the vapor pressure of water in equilibrium with the mixture of reactants. Heating is continued until desired crystalline zeolite product is formed. The zeolite crystals are then separated from the mother liquor and washed, preferably with distilled water.

In the synthesis of zeolite Beta, it has been found that the composition of the reaction mixture is critical. Specifically, the presence of tetraethylammonium ions in such mixture has been found to be essential for the production of zeolite Beta.

In the absence of such ions or even in the presence of quaternary ammonium ions other than tetraethyl no zeolite Beta is obtained.

ZSM-23 has a formula, in terms of mole ratios of oxides and in the anhydrous state, as follows: (0.7–2.8)-$R_2O$ : (0.08–0.25)$M_2O$ ; $Al_2O_3$ : (50–220)$SiO_2$ wherein R is a nitrogen-containing organic cation, such as, for example, that derived from pyrrolidine and M is an alkali metal cation, especially sodium.

Zeolite ZSM-23 can be suitably prepared by providing a solution containing sources of an alkali metal oxide, preferably sodium oxide, sources of nitrogen-containing cation, preferably pyrrolidine, an oxide of aluminum, an oxide of silicon and water having a composition, in terms of mole ratios or oxides, falling within the following ranges:

$R^+/R^+ + M^+$ : 0.85–0.95
$OH^-/SiO_2$ : 0.01–0.049
$H_2O/OH^-$ : 200–600
$SiO_2/Al_2O_3$ : 55–70 wherein R is an organic nitrogen-containing cation and M is an alkali metal ion, and maintaining the mixture until crystals of the zeolite are formed. The quantity of $OH^-$ is calculated only from the inorganic sources of alkali, without any organic base contribution. Thereafter, the crystals are separated from the liquid and recovered. Typical reaction conditions consist of heating the foregoing reaction mixture to a temperature above 280° F. to about 400° F. for a period of time of from about 6 hours to about 14 days. A more preferred temperature range is from about 300° F. to about 375° F. with the amount of time at a temperature in such a range being from about 24 hours to about 11 days.

The composition for the synthesis of synthetic ZSM-23 can be prepared utilizing the materials which can supply the appropriate oxide. Such compositions include aluminates, alumina, silicates, silica hydrosol, silica gel, silicic acid and hydroxides. It will be understood that each oxide component for ZSM-23 can be supplied by one or more essential reactants and they can be mixed together in any order. For example, any oxide can be supplied by an aqueous solution, sodium hydroxide or by an aqueous solution of a suitable silicate; the cation derived from pyrrolidine can be either supplied by pyrrolidine or a salt thereof. The reaction mixture can be prepared either batchwise or continuously. Crystal size and crystallization time of the ZSM-23 composition will vary with the nature of the reaction mixture employed.

ZSM-35 has a formula, in terms of mole ratios of oxides and in the anhydrous state, as follows:

$$(0.4–2.5)R_2O:(0.06) M_2O : Al_2O_3 : xSiO_2$$

wherein R is an organic nitrogen-containing cation derived from ethylenediamine or pyrrolidine, M is an alkali metal, especially sodium, and x is from greater than 8 to about 50.

Zeolite ZSM-35 can be suitably prepared by providing a solution containing sources of an alkali metal oxide, preferably sodium oxide, an organic nitrogen-containing oxide, an oxide of aluminum, an oxide of silicon and water and having a composition, in terms of mole ratios of oxides, falling within the following ranges:

| $R^+$ | Broad | Preferred |
|---|---|---|
| $R^+ + M^+$ | 0.2–1.0 | 0.3–0.9 |
| $OH^-/SiO_2$ | 0.05–0.5 | 0.07–0.49 |
| $H_2O/OH^-$ | 41–500 | 100–250 |
| $SiO_2/Al_2O_3$ | 8.8–200 | 12–60 | wherein R is an organic nitrogen-containing cation derived from ethylenediamine of pyrrolidine and M is an alkali metal ion, and maintaining the mixture until crystals of the zeolite are formed. The quantity of $OH^-$ is calculated only from the inorganic sources of alkali without any organic base contribution. Thereafter, the crystals are separated from the liquid and recovered. Typical reaction conditions consist of heating the foregoing reaction mixture to a temperature of from about 90° to about 400° F. for a period of time from about 6 hours to about 100 days. A more preferred temperature is from about 150° to about 400° F. with the amount of time in such range being from about 6 hours to about 80 days.

The composition for synthesis of synthetic ZSM-35 can be prepared utilizing materials which can supply the appropriate oxide. Such compositions include aluminates, alumina, silicates, silica hydrosol, silica gel, silicic acid and hydroxides. It will be understood that each oxide component utilized in the reaction mixture for preparing ZSM-35 can be supplied by one or more essential reactants and they can be mixed together in any order. For example, any oxide can be supplied by an aqueous solution, sodium hydroxide or by an aqueous solution of a suitable silicate; the organic nitrogen-containing cation, such as, for example, the hydroxide or a salt, as well as by the indicated amines. The reaction mixture can be prepared either batchwise or continuously. Crystal size and crystallization time of the ZSM-35 composition will vary with the nature of the reaction mixture employed.

ZSM-6 has a formula, in terms of mole ratios of oxides and in the anhydrous state, as follows: (0.1 to 1.5) $R_2O$: (0.01 to 1.49) $M_2O:Al_2O_3$: (25 to 130) $SiO_2$ where R is a nitrogen-containing cation, such as that derived from a tetramethyl-ammonium compound and M is an alkali metal cation, e.g., sodium.

Zeolite ZSM-6 can be suitably synthesized by preparing a solution containing sources of an alkali metal oxide, preferably sodium oxide or hydroxide, sources of organic nitrogen-containing cation, preferably tetramethylammonium chloride or hydroxide, aluminum oxide, silicon dioxide and water and having a composition, in terms of mole ratios of oxides, falling within the following ranges:

$R/(R^+ + M^+) = 0.1$–$0$ –$0.99$
$OH^-/SiO_2 = 0.001$–$0.25$
$H_2O/OH^- = 50$–$150$
$SiO_2/Al_2O_3 = 25$–$300$ wherein R is an organic nitrogen-containing cation and M is an alkali metal ion, and maintaining the mixture until crystals of the zeolite are formed. The quantity of $OH^-$ is calculated only from the inorganic sources of alkali without any organic base contribution. Thereafter, the crystals are separated from the liquid reaction medium such as cooling the whole to room temperature, filtering and water washing. Typical reaction conditions consist of heating the foregoing reaction mixture to a temperature of from about 100° C. to about 177° C. for a period of time of from about 48 hours to about 60 days. A more preferred temperature range is from about 100° C. to about 150° C. with the amount of time at a temperature in such range being from about 4 days to about 60 days.

The composition for the synthesis of synthetic ZSM-6 can be prepared utilizing materials which can supply the appropriate oxide. Such compositions include aluminates, alumina, silicates, silica hydrosol, silica gel, silicic acid and hydroxides. It will be understood that each oxide component utilized in the reaction mixture for preparing ZSM-6 can be supplied by one or more essential reactants and they can be mixed together in any order. For example, any oxide can be supplied by an aqueous solution, sodium hydroxide or by an aqueous solution of a suitable silicate; the cation derived from a tetramethylammonium compound can be supplied by the hydroxide or halide. The reaction mixture can be prepared either batchwise or continuously. Crystal size and crystallization time of the ZSM-6 composition will vary with the nature of the reaction mixture employed.

ZSM-47 has a formula in terms of mole ratios of oxides and in the anhydrous state, as follows: (0.01 to 0.3) $M_2O$ :(0.6 to 1.6) $R_2O:Al_2O_3$: (15 to 50) $SiO_2$ where R is a nitrogencontaining organic cation, such as that derived from a 2-(hydroxyalkyl)-trialkylammonium compound, the alkyl groups of which are methyl, ethyl or a combination thereof, such as, for example, 2-(hydroxethyl)-trimethylammonium chloride or from a tetramethylammonium compound and M is an alkali metal cation, e.g., sodium, potassium or rubidium.

Zeolite ZSM-47 can be suitably synthesized by preparing a solution containing sources of sodium oxide, nitrogen-containing organic cations, preferably a 2-(hydroxyalkyl)trialkylammonium compound or a tetramethylammonium compound, aluminum oxide, silicon dioxide and water and having a composition, in terms of mole ratios of oxides falling within the following ranges:

$R^+/(R^+ + M^+) + 0.01-1.0$
$OH^-/SiO_2 + 0.1-0.8$
$H_2O/OH^- + 10-100$
$SiO_2/Al_2O_3 + 10-80$ wherein R is an organic nitrogen-containing cation and M is an alkali metal ion and maintaining the mixture until crystals of the zeolite are formed. Thereafter, the crystals are separated from the liquid reaction medium, as by cooling the whole to room temperature, filtering and water washing. Typical reaction conditions consist of heating the foregoing reaction mixture to a temperature of from about 75° C. to about 175° C. for a period of time of from about 6 hours to about 150 days. A more preferred temperature range is from about 90° C. to about 150° C. with the amount of time at a temperature in such range being from about 24 hours to about 105 days.

The composition for the synthesis of synthetic ZSM-47 can be prepared utilizing materials which can supply the appropriate oxide. Such compositions include aluminates, alumina, silicates, silica hydrosol, silica gel, silicic acid and hydroxides. It will be understood that each oxide component utilized in the reaction mixture for preparing ZSM-47 can be supplied by one or more essential reactants and they can be mixed together in any order. For example, any oxide can be supplied by an aqueous solution of a suitable silicate. The silicon dioxide reactant may be a finely dispersed, highly reactive silica such as obtained by precipitation from an aqueous solution or a silicate or by vapor-phase hydrolysis of a silicon halide, e.g., chloride or bromide. The silicon dioxide may also be provided as a colloidal silica sol. The reaction mixture can be prepared either batchwise or continuously. Crystal sizes and crystallization time of the ZSM-47 composition will vary with the nature of the reaction mixture employed.

Of the zeolites discussed above, the present method is preferably employed to decompose the organic cations contained in zeolite Beta to activate same. Most preferably, the present method is employed to decompose TEA cations contained in the assynthesized sodium form of zeolite Beta.

The organic cation-containing crystalline zeolite is contacted with steam under conditions which will result in the decomposition of the organic material contained in the zeolite. More specifically, the crystalline zeolite is steamed at a temperature from about 500° F. to about 1000° F. Preferably, the temperature of the steaming step ranges from about 600° F. to about 900° and, most preferably, from about 650° F. to about 800°.

The steam precalcination of the crystalline zeolite should be continued for a time sufficient to at least substantially decompose the organic material without having any debilitating effect on the crystalline structure of the zeolite. A sufficient period of time will generally be between about 2 to about 24 hours, preferably between 3 to about 10 hours and, most preferably, between 4 to about 8 hours.

The exact temperature and treatment time involved in contacting the crystalline zeolite with steam will vary within those ranges discussed above and, of course, will depend to a certain degree, upon the particular zeolite being treated and the nature of the organic material sought to be decomposed.

The decomposing, by steam, of the organic cations can result in the production of some undesirable contaminants which must be gathered in some manner so that they may either be discarded or employed in other reactions which make use of these contaminants.

Figure 4:
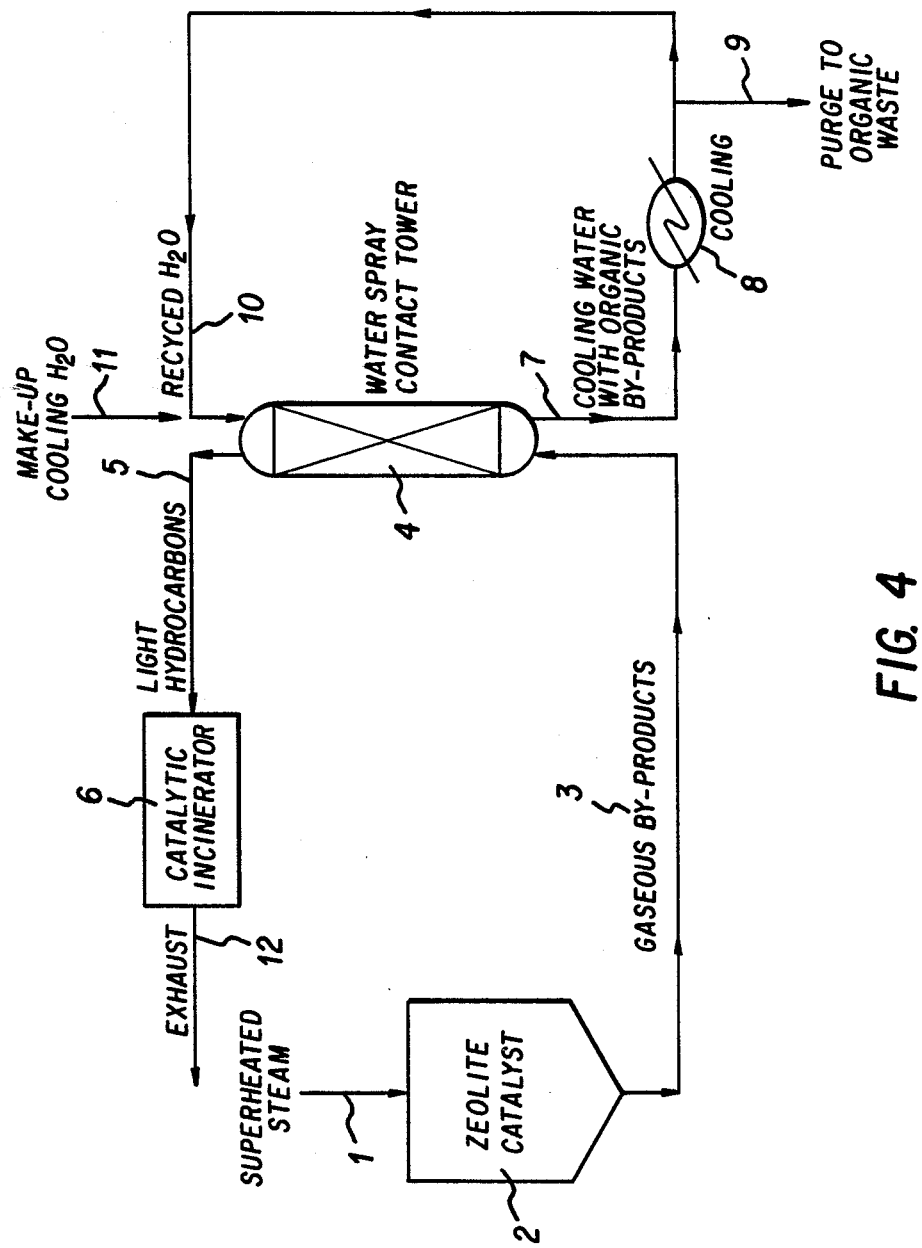
FIG. 4 is a schematic illustration of the method of the present invention.

To this end, the contaminants produced by the steaming are subsequently condensed by, for instance, direct water contact in a packed tower as indicated in FIG. 4. The cooling water containing condensed products may be further cooled by heat exchange before being recycled to the contact tower as the cooling medium. A buildup of contaminants is controlled by removal of a portion of this stream to a waste water treatment facility. Light hydrocarbon containing effluent from the contact tower may be combusted in a catalytic combustion device with oxygen or air sufficient to effect complete combustion.

Following the steam activation step, it is generally desirable to complete the calcination process with air. This step provides complete removal of the residual carbon and nitrogen remaining on the catalyst. Additionally, air calcining up to 1000° F. insures conversion of the binder alumina to a high strength phase, providing for an extrudate product with good physical properties.

The calcining of the steamed crystalline zeolite can be accomplished by heating the same at a temperature within a range from about 750° F. to about 1100° F., in an atmosphere of air or nitrogen and air. The heating should be continued for a time period ranging from about 2 to about 10 hours.

An organic cation containing crystalline zeolite which has been activated by steaming in accordance with the present invention and which can also be subsequently subjected to other calcination such as heating in air, has an alpha activity which is not affected by the steam treatment. The acid activity of zeolite catalysts is conveniently defined by the alpha scale described in an article published in *Journal of Catalysis*, Vol. VI, pp. 278-287 (1966). In this test, the zeolite catalyst is contacted with hexane under conditions prescribed in the publication and the amount of hexane which is cracked is measured. From this measurement is computed an "alpha" value which characterizes the catalyst for its cracking activity for hexane.

In practicing organic compound conversion with a zeolite catalyst treated in accordance herewith, said zeolite may be incorporated with a matrix or support material which is resistant to high temperatures or which imparts a degree of ease in handling. Such matrix materials include synthetic or naturally occurring substances such as clay, silica and/or metal oxides. The latter may be either naturally occurring or in the form of gelatinous precipitates or gels including mixtures of silica and metal oxides. Naturally occurring clays which can be composited with the modified solid materials include those of the montmorillonite and kaoline families which include the subbentonites and the kaolins commonly known as Dixie, McNamee, Georgia and Florida clays or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the treated zeolites of this invention may be compositioned with a porous matrix materials, such as silica, alumina, silica-alumina, silica-magnesia, silica-zirconia, silica-thoria, silica-berylia, silica-titania, as well as ternary compositions such as silica-alumina-thoria, silica-alumina-zirconia, silica-alumina-magnesia and silica-magnesia-zirconia. The matrix may be in the form of a cogel. The relative proportions of finely divided zeolite treated in accordance herewith and inorganic oxide gel matrix may vary widely with the zeolite content ranging from between about 1 to about 99 percent by weight and more usually in the range of about 5 to about 80 percent by weight of the composite.

Referring with particularity to the drawings, illustrated in FIG. 1 is the emission profile of ethylene during steam-precalcination of the nickel-tungsten and tungsten zeolite Beta catalysts at 810° F., 880° F., 890° F. and 1000° F.

Figure 2:
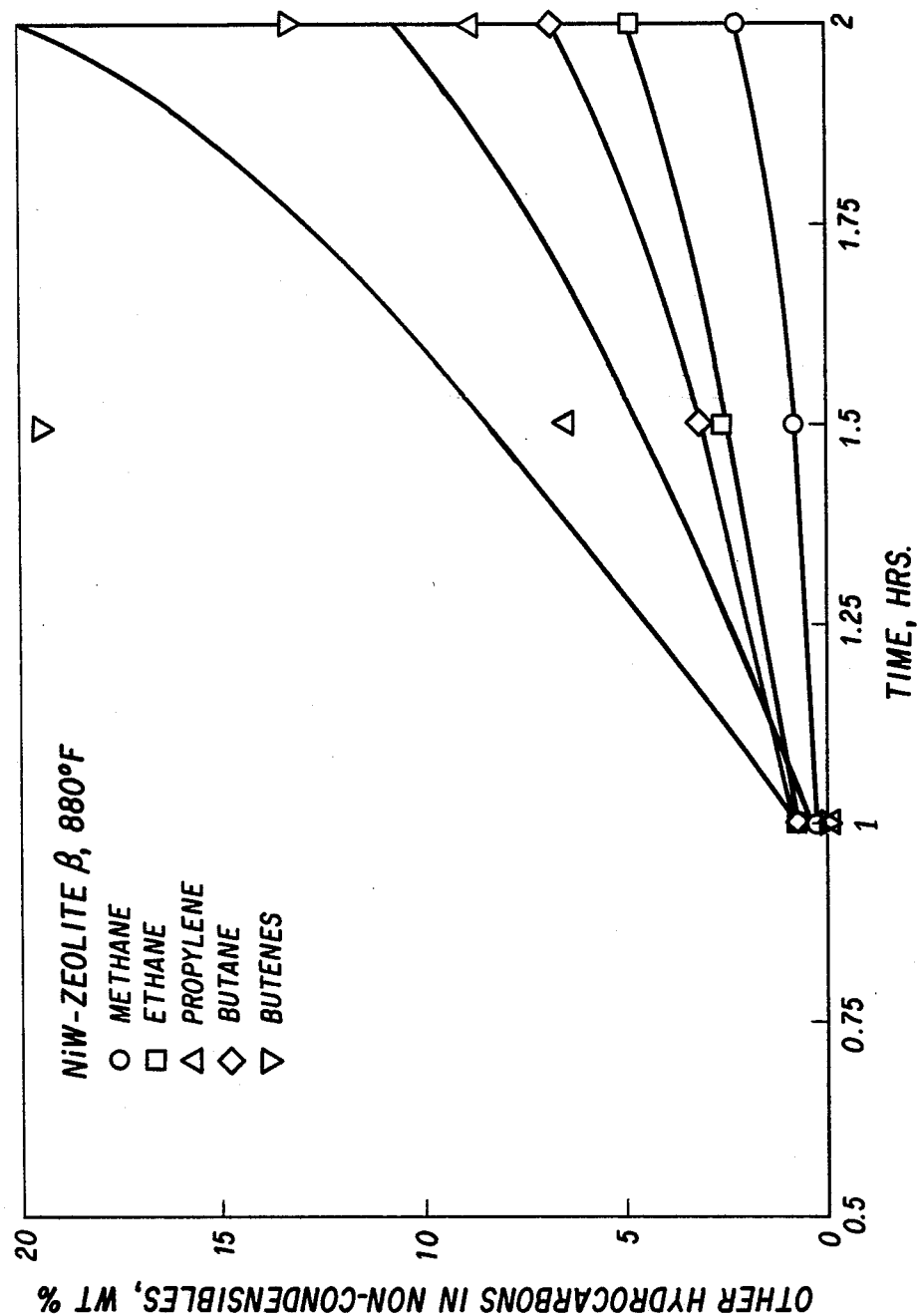
FIG. 2 illustrates the emission profile of other hydrocarbons during the steam precalcination of Ni-W zeolite Beta at 880° F.
Figure 3:
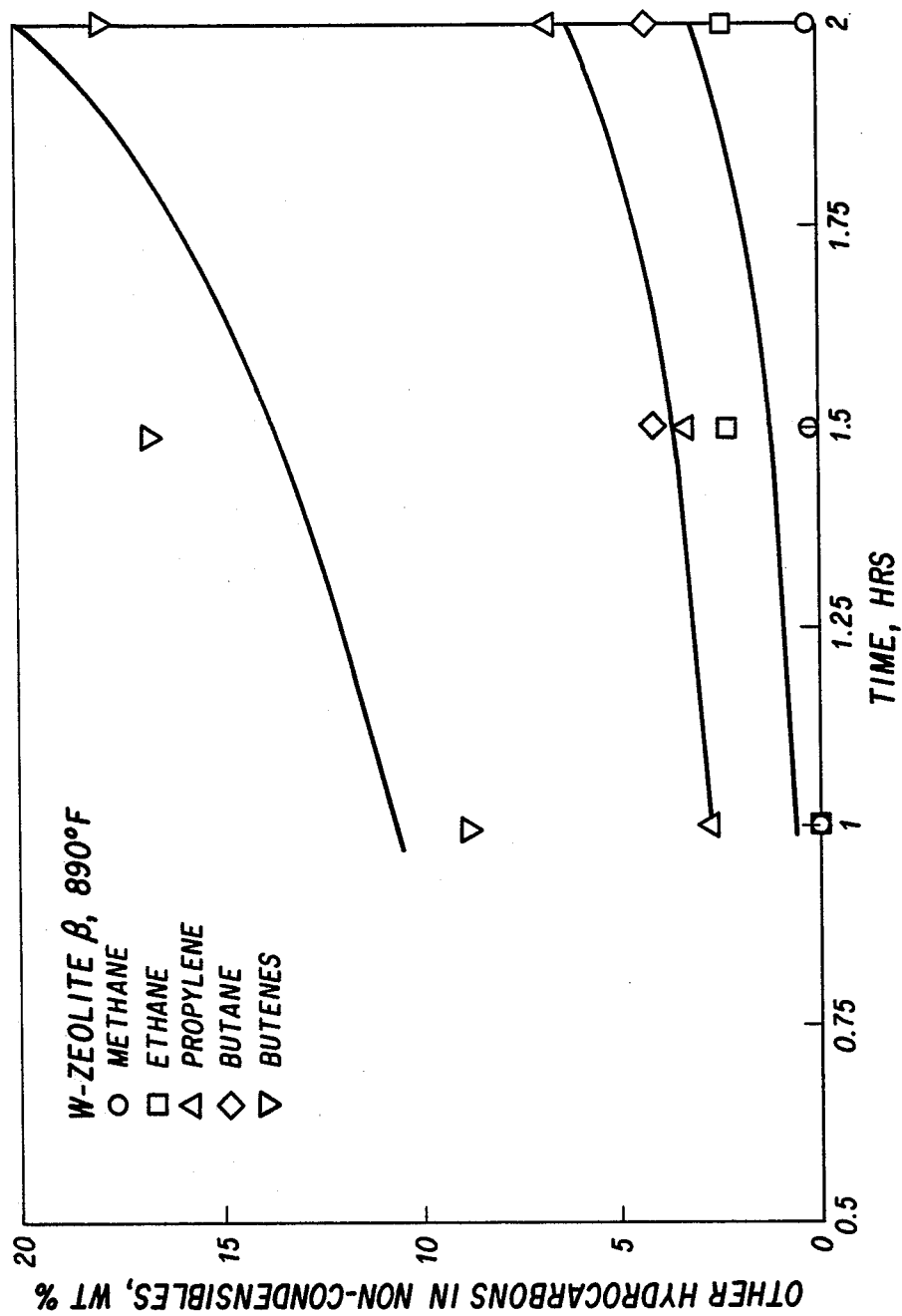
FIG. 3 illustrates the emission profile of other hydrocarbons during the steam precalcination of W-zeolite Beta at 890° F.

FIGS. 2 and 3 show the emissions profile of hydrocarbons other than ethylene. These "other hydrocarbons" were predominately $C_7$ and lower hydrocarbons.

In the emission profile of FIGS. 1, 2 and 3 no aromatics were detected.

FIG. 4 illustrates the method of the present invention. The zeolite catalyst contained in vessel 2 is held in the presence of superheated steam introduced via stream 1 for a sufficient time to decompose organic material in the zeolite. Contaminant by-products in gaseous form produced by the steaming are removed by effluent stream 3. The $C_4$ + contaminant by-products are condensed in a water spray contact tower 4. Effluent stream 5 containing non-condensable light hydrocarbon by-product such as ethylene resulting from the steaming of zeolite $\beta$ to remove organic cations, exits the water spray contact tower. The light hydrocarbon by-product may then be oxidized in a combustion incinerator 6, such as a copper chromite catalyst containing reactor. Oxidation products exit through exhaust conduit 12.

The cooling water from the water spray contact tower 4 containing other condensed organic by-products exits in stream 7 and is further cooled by heat exchanger 8. Some of the cooled water containing condensed organic by-products is purged as organic waste stream 9. The organic by-products being removed here are those shown in Table II. Although the by-products in the cooled water as shown in Table II are present in very small amounts, a small purge is undertaken to prevent contaminant build-up. The cooling water is then recycled to the water spray contact tower via recycle stream 10. Fresh make-up cooling water is added by stream 11 sufficient to provide constant water flow in the system.

As discussed in further detail hereinafter, ethylene is a major product resulting from the steaming of the organic cation-containing zeolite Beta. Other light hydrocarbons such as $C_4$ and lower can also result from steaming of zeolites containing organic cations. The ethylene resulting from the organic cation decomposition in zeolite Beta by steaming, can subsequently be oxidized to convert ethylene or other such light hydrocarbon byproducts to, among other things, carbon dioxide. The oxidation of ethylene is preferably conducted over an oxidation catalyst such as copper chromite. The ethylene can be combusted at a temperature of at least about 600° F. for optimum ethylene conversion. Preferably, the temperature of combustion ranges from between about 600° F. to about 650° F.. The stoichiometric mole ratio of oxygen to ethylene needed to provide complete combustion is about 3 to 1, respectively. Other processing parameters include a gas hourly space velocity (GHSV) of between about 9,000 to about 20,000.

Figure 5:
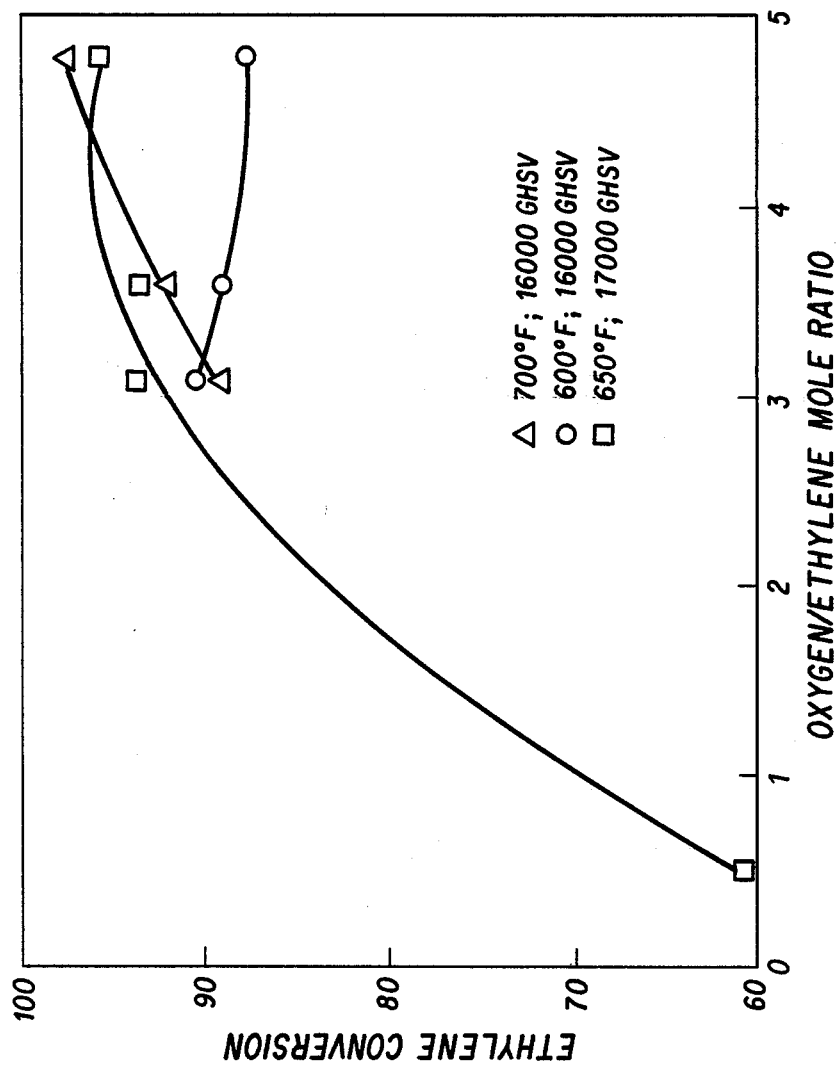
FIG. 5 graphically illustrates the effect of oxygen to ethylene mole ratio on ethylene conversion.

FIG. 5 graphically illustrates the oxidation of ethylene by-product resulting from the steaming of the organic cation-containing zeolite $\beta$ to decompose organic cations. It shows the effect of oxygen/ethylene ratio on the oxidation of ethylene by-product in a copper chromite catalyst containing reactor. FIG. 5 shows that the combustion of ethylene was optimum at an oxygen to ethylene mole ration of 3 to 1. It is apparent from the figure that at the above indicated mole ratio, more than 85% ethylene conversion was achieved at temperatures greater than 600° F. with a gas hourly space velocity (GHSV) of 16,000–17,000.

In order to more fully appreciate the nature and significance of the present invention and the manner of practicing same, the following examples are presented.

Preparation of Catalyst A

Catalyst A ("Ni W Zeolite $\beta$")was prepared as follows:
To a mix-muller the following were added in sequence, and mulled 10 minutes after each addition,

| | |
|---|---|
| 689 gm | ammonium form Zeolite $\beta$ (NH$_4$ TEA Zeolite $\beta$) at 72.6% solids (at 1000° F.) |
| 661 gm | Kaiser Versal 250 alumina at 75.6% solids |
| 493 gm | Ammonium metatungstate solution (42% wt) |
| 597 gm | Nickel Nitrate Hexahydrate solution (42.5% wt) |

The mix was extruded using a 2" Bonnot extruder through a 1/16" die plate. The extrudate product was then dried overnight in a forced air oven at 250° F.

Preparation of Catalyst B

Catalyst B ("W Zeolite $\beta$") was prepared as follows:
To a mix-muller the following were added in sequence with 10 minute mulling after each addition,

| | |
|---|---|
| 615 gm | NH$_4$ TEA Zeolite $\beta$ at 81.3% solids (at 1000° F.) |
| 661 gm | Kaiser Versal 250 alumina at 75.6% solids |

-continued

| | |
|---|---|
| 1010 gm | Ammonium metatungstate solution (23.1% wt) |

The mix was extruded using a 2" Bonnot extruder through a 1/16" die plate. The extrudate product was then dried overnight in a forced air oven at 250° F.

EXAMPLES

In all of the following examples, the catalyst was initially heated to 400° F. in a first step in a tube furnace in flowing nitrogen to dehydrate the zeolite. The nitrogen was then replaced with flowing steam. Instead of nitrogen in the first step, air or steam may be used. It may be noted that decomposition of organic cations does not take place during the initial heating in nitrogen, steam, or air to 400° F. After the first step, the following subsequent steps were performed.

Example 1

Catalyst A was contacted with steam at a temperature of 750° F. for 2 hours to decompose the organic cations.

Example 2

Catalyst A was contacted with steam at a temperature of 800° F. for 2 hours to decompose the organic cations.

Example 3

Catalyst A was contacted with steam at a temperature of 850° F. for 2 hours to decompose the organic cations.

Example 4

Catalyst A was contacted with steam at a temperature of 880° F. for 1.5 hours to decompose the organic cations.

Example 5

Catalyst A was contacted with steam at a temperature of 1000° F. for 1.5 to 2 hours to decompose the organic cations.

Example 6

Catalyst B was contacted with steam at a temperature of 812° for 1.5 to 2 hours to decompose the organic cations.

Example 7

Catalyst B was contacted with steam at a temperature of 892° F. for 1.5 to 2 hours to decompose the organic cations.

In all examples, the contaminants produced from decomposing the organic cations in the zeolite catalyst were condensed in an ice water cooled trap.

The gas phase (Gas Product) and aqueous phase (Liquid Product) by-products from the decomposition of organic cations were analyzed to determine their compositions. The results are shown below in Table I along with the compositions of Catalyst A and Catalyst B which were treated as described in Examples 1 through 7.

TABLE I

| Examples | 1 | 2 | 3 | 4 | 5 | 6 | 7 |
|---|---|---|---|---|---|---|---|
| Catalyst wt. loss (gms) | 7.0 | 8.3 | 8.7 | 9.0 | 9.0 | 7.0 | 7.0 |
| Catalyst wt. loss (%) | 17.5 | 20.7 | 21.7 | 22.5 | 22.5 | 17.5 | 17.5 |
| Vol. of gas (cc) | 2265 | 7560 | 6909 | 5324 | 5569 | 1049 | 991 |
| Condensate wt. gain (gms) | — | — | 5.9 | — | 4.0 | 5.0 | 3.0 |
| Condensate wt. (gms) | — | — | 44.9 | — | 46 | 42 | 42 |
| pH of condensate | 8.8 | 9.0 | 8.8 | 9.1 | 9.0 | 11.4 | 11.3 |
| Gas Product Analysis (wt. %) | | | | | | | |
| Ethylene | — | — | — | 91.9 | 87.7 | 89.6 | 65.9 |
| Ethane | — | — | — | 0.8 | 0.8 | — | — |
| Propylene | — | — | — | — | 0.1 | 2.5 | 2.7 |
| Propane | — | — | — | 0.3 | 0.3 | 0.3 | 0.7 |
| Butene | — | — | — | — | — | 0.8 | 8.5 |
| Butane | — | — | — | 0.6 | 4.7 | 5.2 | 17.4 |
| Pentane | — | — | — | 0.3 | 0.3 | 1.0 | 2.1 |
| TOTAL | — | — | — | 99.7 | 99.7 | 99.4 | 99.3 |
| Liquid Product Analysis (wt. %) | | | | | | | |
| Ethanol | 0.60 | 0.50 | 0.30 | 0.40 | 0.30 | 0.70 | 0.75 |
| Acetonitrile | 0.15 | 0.20 | 0.10 | 0.10 | 0.10 | 0.00 | 0.00 |
| Triethylamine | 0.00 | 0.00 | 0.00 | 0.00 | 0.00 | 0.07 | 0.40 |
| Other organics | 0.05 | 0.05 | 0.10 | 0.00 | 0.10 | 0.10 | 0.45 |
| $H_2O$ | 99.2 | 99.2 | 99.5 | 99.5 | 99.5 | 99.2 | 98.8 |
| N Analysis | 0.6 | 0.3 | 0.4 | 0.4 | 0.4 | 0.2 | 0.3 |
| Catalyst Analysis (wt. %) | | | | | | | |
| Ni | 3.8 | 3.9 | 4.0 | 4.1 | 4.3 | — | — |
| W | 14.5 | 15.0 | 14.5 | 14.5 | 15.0 | 15.0 | 14.5 |
| C | 1.2 | 1.1 | 1.0 | 1.2 | 1.0 | 0.4 | 0.5 |
| N | 0.2 | 0.1 | 0.1 | 0.2 | 0.2 | 0.05 | 0.2 |
| Ash | 92 | 94 | 95 | — | — | 94 | 96 |
| Surface Area ($m^2/g$) | 393 | 363 | 387 | — | — | 366 | — |
| Amt. of N in condensate (gms) | — | — | 0.18 | — | 0.18 | 0.08 | 0.13 |
| Amt. of N in gas (gms) | — | — | 0.72 | — | 0.72 | 0.22 | 0.17 |
| TOTALS | — | — | 2.36 | — | 2.36 | 0.72 | 0.56 |

As these data demonstrate, ethylene is the major product in the gas phase and ethanol is the major product in the aqueous phase. Thus, as indicated, the present method for activating an organic cation-containing zeolite catalyst does not result in the production of any significant amounts of undesirable aromatic by-products. Furthermore, it has been shown that in the present invention, the ethylene and other light hydrocarbon by-products can be condensed and collected.

A gas chromatographic analysis of ice trap condensates resulting from the above described steam calcinations of Catalyst A and Catalyst B is presented below in Table II. These detailed data represent the amount (by weight percent) of the major contaminants present in the aqueous phase.

TABLE II

| Examples | 1 | 2 | 3 | 4 | 5 | 6 | 7 |
|---|---|---|---|---|---|---|---|
| Acetaldehyde | 0.02 | 0.02 | 0.01 | 0.01 | 0.01 | 0.008 | 0.01 |
| Ethanol | 0.6 | 0.5 | 0.3 | 0.4 | 0.3 | 0.7 | 0.75 |
| Acetonitrile | 0.15 | 0.2 | 0.1 | 0.1 | 0.1 | <0.003 | <0.004 |
| Unknown | 0.02 | <0.005 | <0.006 | 0.01 | 0.01 | <0.003 | <0.004 |
| Unknown | <0.005 | <0.005 | <0.006 | 0.004 | <0.005 | 0.006 | 0.007 |
| Diethylamine | <0.005 | <0.005 | <0.006 | 0.004 | <0.005 | 0.01 | 0.01 |
| 1-butanol | <0.005 | 0.005 | <0.006 | 0.004 | <0.005 | <0.003 | <0.004 |
| Acetic Acid | 0.01 | 0.01 | 0.007 | 0.008 | 0.007 | 0.01 | 0.02 |
| Triethylamine | <0.005 | <0.005 | <0.006 | <0.003 | <0.005 | 0.07 | 0.4 |

TABLE II-continued

| Examples | 1 | 2 | 3 | 4 | 5 | 6 | 7 |
|---|---|---|---|---|---|---|---|
| Diethylnitrosamine | 0.01 | 0.04 | 0.01 | <0.003 | 0.008 | <0.003 | 0.004 |
| Total wt. % elutable organics | 0.8 | 0.8 | 0.5 | 0.5 | 0.5 | 0.8 | 1.2 |

As these data demonstrate, the total amount of the major contaminants in the aqueous phase is relatively negligible.

Table III below illustrates the alpha activity of catalyst B after being subjected to steaming in accordance with examples 2 to 4, followed by a further step of air calcination at about 750° F. to 110° F. for 2 to 10 hours to remove residual carbon and nitrogen.

TABLE III

| Examples | 2 | 3 | 4 |
|---|---|---|---|
| Steaming Condition Temp., °F. | 600 | 650 | 700 |
| Hrs. | 2 | 2 | 2 |
| Alpha Activity | 273 | 250 | 271 |

The alpha activity of the same catalyst prepared by conventional nitrogen calcination would be expected to be 250–350. These data demonstrate that the alpha activity of the catalyst after steaming in accordance with the present invention does not significantly differ from that of catalyst prepared by nitrogen calcination.

Example 8

A standard copper chromite catalyst (Cu-1230E) was loaded into a tubular reactor (0.5 g, 40×50 mesh), which constituted part of the conversion apparatus illustrated in FIG. 4. The catalyst bed temperature was permitted to equilibrate with a small nitrogen purge before ethylene was introduced. The ethylene was introduced into the reactor followed by a slow introduction of air while reducing the flow rate of nitrogen. Ethylene was introduced into the reactor in an oxygen to ethylene mole ratio from 0.33 to 4.78 at gas hourly space velocity ranging from about 9000 to about 20000. The catalyst bed temperature was properly adjusted so that the average temperature at the top and bottom of the catalyst both were fixed at the desired temperature (600° F.–650° F.). After a 45 minute interval had elapsed, a gas bomb was collected for analysis by mass spectroscopy.

Mass spectroscopy indicated that the products resulting from the ethylene oxidation described in Example 8 were carbon dioxide, carbon monoxide, $H_2O$, and some butane. Preferred conditions for optimum ethylene conversion were determined. The results are shown in Tables IV, V and VI and FIG. 5.

The effect of the catalyst bed temperature on ethylene conversion is illustrated in Table IV, where it is shown that at temperatures about 600° F. and under the same oxygen to ethylene mole ratios and similar GHSV's, ethylene conversion was rapid and not significantly affected by changes in bed temperature.

As illustrated in Table V, the amount of ethylene conversion is not effected by the total GHSV.

However, as demonstrated in FIG. 5 and Table VI, the most important processing variable for ethylene conversion is the oxygen to ethylene mole ratio at constant GHSV and bed temperature. The ethylene conversion increases as the mole ratio of $O_2/C_2H_4$ increases until such mole ratio reaches about 3 to 1 at a temperature above 650° F.

TABLE IV

The Effect of Catalyst Bed Temperature on Ethylene Conversion

| Run # | Gas Hourly Space Velocity | T (°F.) | Oxygen to Ethylene Mole Ratio | Ethylene Conversion |
|---|---|---|---|---|
| 1. | 17000 | 700 | 4.78 | 97.7 |
| 2. | 17000 | 650 | 4.78 | 95.4 |
| 3. | 17000 | 600 | 4.78 | 87.5 |
| 4. | 16000 | 700 | 3.1 | 89.0 |
| 5. | 16000 | 650 | 3.1 | 93.4 |
| 6. | 16000 | 600 | 3.1 | 90.2 |
| 7. | 9540 | 700 | 3.1 | 95.4 |
| 8. | 9540 | 650 | 3.1 | 88.9 |
| 9. | 9540 | 600 | 3.1 | 100 |

TABLE V

The Effect of Gas Hourly Space Velocity on Ethylene Conversion

| Run # | Gas Hourly Space Velocity | T (°F.) | Oxygen to Ethylene Mole Ratio | Ethylene Conversion |
|---|---|---|---|---|
| 10. | 11100 | 650 | 3.68 | 93.3 |
| 11. | 14000 | 650 | 3.68 | 93.7 |
| 12. | 16000 | 650 | 3.68 | 93.2 |
| 13. | 11100 | 600 | 3.68 | 83.8 |
| 14. | 14000 | 600 | 3.68 | 84.5 |
| 15. | 16000 | 600 | 3.68 | 88.8 |
| 16. | 9540 | 700 | 3.1 | 95.4 |
| 17. | 14000 | 700 | 3.1 | 90.7 |
| 18. | 16000 | 700 | 3.1 | 89.0 |

TABLE VI

Oxygen/Ethylene Ratio Effect on Ethylene Conversion

| Run # | Gas Hourly Space Velocity | T (°F.) | Oxygen to Ethylene Mole Ratio | Ethylene Conversion |
|---|---|---|---|---|
| 19. | 17000 | 650 | 4.78 | 95.4 |
| 20. | 16000 | 650 | 3.68 | 93.2 |
| 21. | 16000 | 650 | 3.12 | 93.4 |
| 22. | 17000 | 650 | .5 | 60.8 |
| 23. | 19000 | 650 | .33 | 13.3 |
| 24. | 17000 | 700 | 4.78 | 97.2 |
| 25. | 14000 | 700 | 3.68 | 91.8 |
| 26. | 16000 | 700 | 3.12 | 89.0 |
| 27. | 16000 | 600 | 4.78 | 87.5 |
| 28. | 16000 | 600 | 3.68 | 88.8 |
| 29. | 17000 | 600 | 3.12 | 90.2 |

Therefore, it is apparent from Table IV that optimum bed temperature ethylene conversion is from about 600° F. to about 650° F.; Table VI shows that about a 3 to 1 oxygen to ethylene mole ratio is optimum; and Table V shows that a gas hourly space velocity of about 9000–20000 is optimum.

The same process can be used for the combustion of other light hydrocarbons of $C_4$ and lower resulting from the steam activation of zeolite catalyst containing organic cations.

Furthermore, these data show that light hydrocarbon by-products resulting from steam treatment of organic cation containing zeolites to decompose organic cations can be effectively combusted over an oxidation catalyst to yield environmentally safe products.

While preferred embodiments and several variations of the present invention are described in detail herein, it should be apparent that the disclosure and teachings of the present invention will suggest many alternative designs to those skilled in the art.

What is claimed is:

1. A method for activating an organic cation-containing crystalline catalyst by removal of the organic cation which comprises contacting the catalyst with steam for a sufficient time and under conditions resulting in substantial decomposition of the organic cation and activation of the catalyst.

2. The method of claim 1 wherein the organic cation-containing catalyst is selected from the Group consisting of ZSM-5, ZSM-6, ZSM-11, ZSM-12, ZSM-20, ZSM-22, ZSM-23, ZSM-35, ZSM-47, ZSM-48, and zeolite Beta.

3. The method of claim 1 wherein the organic cations are selected from the group consisting of tetramethylammonium, tetraethylammonium, tetrapropylammonium, tetrabutylammonium, tetrabutylphosphonium, monopropylamine, dipropylamine, and organic nitrogen-containing cations derived from ethylenediamine, pyrrolidine or 2-(hydroxyalkyl)-trialkylammonium compounds.

4. The method of claim 1 wherein the organic cation-containing zeolite is contacted with steam at a temperature from about 500° F. to about 1100° F.

5. The method of claim 1 wherein the organic cation-containing zeolite is contacted with steam at a temperature from about 600° F. to about 900° F.

6. The method of claim 1 wherein the organic cation-containing zeolite is contacted with steam at a temperature from about 650° F. to about 800° F.

7. The method of claim 1 wherein the organic cation-containing crystalline catalyst is contacted with steam for about 2 to about 24 hours.

8. The method of claim 1 wherein the organic cation-containing crystalline catalyst is contacted with steam for about 3 to about 10 hours.

9. The method of claim 1 wherein the organic cation-containing crystalline catalyst is contacted with steam for about 4 to about 8 hours.

10. The method of claim 1 further comprising the step of condensing any by-products that are produced by the steaming of the organic cations.

11. The method of claim 1 further comprising the step of air calcining the crystalline catalyst after the catalyst has been contacted with steam.

12. The method of claim 11 wherein the crystalline catalyst is calcined in an air containing atmosphere at a temperature from about 750° F. to about 1100° F.

13. The method of claim 11 wherein the crystalline catalyst is calcined from about 2 to about 10 hours.

14. An environmental control method for activating an organic cation-containing zeolite catalyst by removal of the organic cation, the method comprising contacting the catalyst with steam at a temperature from about 600° F. to about 900° F. for about 3 to about 10 hours resulting in substantial decomposition of the organic cation yielding hydrocarbon by-products consisting essentially of hydrocarbons of $C_4$ and lower and condensing the by-products.

15. An environmental control method for activating an organic cation-containing zeolite beta by removal of the organic cation, the method comprising contacting the zeolite beta with steam at a temperature from about 650° F. to about 800° F. for about 4 to about 8 hours resulting in substantial decomposition of the organic cation yielding hydrocarbons by-products consisting essentially of hydrocarbons of $C_4$ and lower and condensing the by-products.

* * * * *